3,385,817
ISOTACTIC POLY(BUTENE-1) FILLED
WITH CARBON BLACK
Robert H. Jones, Ellicott City, Md., assignor to Petro-Tex Chemical Corporation, Houston, Tex., a corporation of Delaware
No Drawing. Filed Dec. 27, 1965, Ser. No. 516,777
5 Claims. (Cl. 260—41)

ABSTRACT OF THE DISCLOSURE

Solid isotactic polybutene-1 compositions having a density from about 0.88 to about 0.92 and containing from 35 to about 300 weight parts of carbon black per 100 weight parts of polybutene-1.

This application is a continuation-in-part application 116,968 filed June 14, 1961, now abandoned.

This invention relates to a novel composition of matter and relates more particularly to solid poly(butene-1) compositions containing carbon black which are useful in the form of molded and extruded goods and articles, and a novel method of preparing such compositions.

It is an object of this invention to provide an improved poly(butene-1) composition for use in extruded and molded goods and articles. It is another object of this invention to provide poly(butene-1) compositions for use in plastic articles and goods which have improved stress cracking properties, increased yield points, and improved processing characteristics. It is a further object of this invention to provide a method whereby an expensive polymer, isotactic poly(butene-1), may be modified through the use of an inexpensive additive without deterioration of desired physical properties of the isotactic poly (butene-1). It is a more particular object of this invention to provide a composition of poly(butene-1), which has improved extrusion characteristics, and pipe therefrom which has improved stress cracking properties, long life load carrying properties, burst strength and the like. It is also an object of this invention to provide a novel and improved method for preparing carbon black-containing poly(butene-1) compositions.

It has now been found, quite unexpectedly, that these and other objects are attained through the use of compositions comprising isotactic poly(butene-1) containing from about 35 to about 200 weight parts of hereinafter defined carbon blacks per 100 weight parts of poly (butene-1). When amounts of carbon black of 35 weight parts or more are mixed with isotactic poly(butene-1), the cost of the resulting composition is reduced and certain properties of the polymer are enhanced without substantial loss of the original good physical properties of the polymer. When such compositions are used to form pipe, improved processing characteristics of the poly(butene-1) is observed, and the resulting pipe has higher burst strength than poly(butene-1) pipe not containing carbon black. This improved burst strength is of the order to withstand temporary overloads. Such pipe also has excellent long term stress bearing properties, excellent stress cracking resistance and other valuable physical properties.

The improvement of certain desirable physical properties of isotactic poly(butene-1) without substantial deterioration of other useful properties through the use of carbon black is quite unexpected since the experience of those skilled in the art has been when large amounts of carbon black are added to other polyolefins such as polyethylene many of the original properties of the polymer are adversely affected so that advantage cannot be taken of use of an inexpensive compounding material. For example, addition of carbon black in substantial quantities to polyethylene or polypropylene results in brittle compositions and the processing characteristics of the polymers are adversely affected. Further, even those carbon blacks which are used in small amounts, as in polyethylene to improve light resistance, have to be particular carbon blacks for the compositions to be useful.

The poly(butene-1)'s used in the compositions of this invention are stereoregular isoactic polymers which may be provided by a number of processes which are known to those skilled in the art. Generally, butene-1 is polymerized with the so-called Ziegler organometallic type catalysts by a stereospecific polymerization using a variety of catalysts which normally are a combination of compounds of Groups IV through VIII transition elements in an oxidation state lower than the maximum and metal hydrides or metal alkyls and the like. Such polymerization systems and the catalysts therefore are described in a number of literature sources, including the patent literature, and more comprehensively in such publications as Linear and Stereoregular Addition Polymers, Norman G. Gaylord and Herman F. Mark, 1954, Interscience Publications, Inc., New York, and the article appearing in the Petroleum Refiner, November 1960, Polyolefin Processes Today, Marshall Sittig.

Normally, compounds of metals of Groups IV through VI are employed with compounds of Groups I through III metals. High yields of isotactic polybutenes are obtained with the polyhalides of Groups IV through VI metals, particularly titanium tetrachloride, and the trichloride which may be derived from the tetrachloride, and with alkyl aluminum compounds, including particularly alkyl aluminum halides, such as triethyl aluminum, tributyl aluminum, ethyl aluminum dichloride, diethyl aluminum chloride, ethyl aluminum sesquichloride and the like. The aluminum compound is normally used in molar excess to the titanium compound. The polymerizations may be conducted in bulk, solution or dispersion, as with an inert hydrocarbon, with an amount of catalyst sufficient to provide the desired conversion to polymer. The amount of catalyst employed is normally from about 0.01 to about 10 percent of the butene-1 being polymerized. The polymerizations may be conducted, depending upon the particular catalyst system, over a wide range of temperatures, from about 0° C. to about 200° C., but more normally are conducted at temperatures within the range of about 30° C. to about 125° C., and at pressures below about 50 atmospheres. The resulting polymers may be isolated from the reaction medium by precipitation, filtration and the like, and such polymers either before or after precipitation, treated as by washing with water and/or alcohols to remove catalyst residue. The polymers are then dried and formed into pellets, bales and the like. The resulting poly(butene-1) has a density above 0.88 (grams/ml. at 25° C.). Another bench mark for characterizing such polymers is by X-ray methods, and these polymers are found to contain more than about 20 percent isotactic, stereoregular or crystalline structures by this method. Such polymers may also be characterized as containing more than 50 percent ether insolubles, having densities within the range of about 0.88 to about 0.92, melt indexes from 0.01 to about 5, and yield points from at least about 500 p.s.i., and may be up to about 3500 p.s.i. or higher. For applications involving molded and extruded goods, particularly pipe, the density is preferably in the range of about 0.9 to about 0.92 with a yield point above 1000 p.s.i., preferably from about 1500 p.s.i. to about 3000 p.s.i. The melt index of such polymers at 190° F. should be between about 0.01 to 2. The Shore D hardness of such materials will be between about 35 and 55. It is an advantage of this invention that lower density poly(butene-1) can be effectively utilized by adding carbon black thereto.

The compositions of this invention have particular utility in a number of molded and extruded applications. As has been stated, it has been found that isotactic poly(butene-1) may be mixed with very large amounts of carbon black to provide inexpensive molding and extrusion compositions, without serious deterioration of other valuable properties, contrary to the experience of those skilled in the art with such polyolefins as polyethylene. Based on experience with other polyolefins it was quite unexpected to find that poly(butene-1) could be compounded to contain high concentrations of carbon black and that such compositions had valuable physical properties. For example, when 50 parts of carbon black are mixed with polyethylene, the resulting materials are of little value and readily crumble. When 50 parts of carbon black are mixed with isotactic polypropylene, the resulting composition is too brittle for any use. In contrast, when 50 parts of carbon black are mixed with isotactic poly(butene-1) the compounds is readily processed, retains good tensile strength and elongation, is tough, has excellent stress and creep properties, increased yield point, and with additional amounts of carbon black becomes stiffer and harder. Another point of contrast to polyethylene is that as carbon black is added to polyethylene it becomes quite brittle and in testing polyethylene compositions containing substantial amounts of carbon black a yield point is never reached, the samples breaking before the yield point is obtained, while in the case of poly(butene-1) the yield point is increased. These novel carbon black-containing isotactic poly(butene-1) polymers also have improved high temperature properties and improved ageing properties. One particular valuable characteristic of these compositions containing, for example, 50 to 100 weight parts of carbon black is their resistance to creep and flow and retention of strength under pressure at elevated temperatures. Isotactic poly(butene-1) containing 50 to 100 weight parts of carbon black retains its shape under fluid pressure for long periods of time at 205° F. Such compositions, in the form of pipe, have a long and reliable pressure life, adequate flexibility and burst strength, and very moderate creep rates.

The rubber and plastic grades of channel blacks and furnace blacks have been found to be most useful in this invention, particularly the furnace blacks. The channel blacks are generally considered as hard processing channel blacks, medium processing channel blacks and easy processing channel blacks having particle sizes from 200 to about 300 angstroms in diameter. The furnace blacks are of generally two types, furnace combustion blacks and furnace thermal blacks. The furnace combustion blacks generally are classed as fine furnace blacks, high modulus furnace blacks and semi-reinforcing furnace blacks. These carbon blacks generally have particle sizes from about 300 to about 800 angstroms. A modified black which is useful in this invention is the so-called abrasion furnace black. The larger furnace thermal blacks normally are of less use when used solely in the composition of this invention and have particle sizes ranging from about 1000 to 3000 angstroms. Preferably the carbon blacks employed have average particle sizes of about 150 to 800 angstroms diameter, and the furnace combustion blacks having a particle size ranging from about 200 to about 800 angstroms have been found to be particularly useful and valuable in the novel compositions of this invention.

The amount of carbon black employed with the isotactic poly(butene-1) may be varied as from about 35 to about 200 or 300 weight parts of carbon black per 100 weight parts of isotactic poly(butene-1). Compositions useful in forming pipe will contain from about 50 to about 100 weight parts of carbon black per 100 weight parts of isotactic poly(butene-1). Compositions containing from 150 to 250 weight parts parts of carbon black per 100 weight parts of isotactic poly(butene-1) may be used to provide valuable, hard, molded articles. A series of useful compositions having a variety of applications will contain from about 35 to 200 weight parts of carbon black, preferably the furnace carbon blacks.

Mixtures of carbon black and the isotactic poly(butene-1) may be prepared by methods known to those skilled in the art by mixing or blending as on a mill, in an internal mixer, and the like. Better results are normally obtained when the carbon black is introduced at or above the softening point of poly(butene-1) to prevent excessive shearing of the polymer, preferably in a closed or internal mixer. Other methods of incorporating the carbon black into the isotactic poly(butene-1) which may be used include adding the carbon black to a solution or dispersion of isotactic poly(butene-1) and thereafter separating the poly(butene-1) and carbon black from solution or dispersion by precipitating, flashing, evaporation and the like.

Another advantage of the use of carbon black is isotactic poly(butene-1) is that such compositions have extremely good stress cracking resistance. No stress cracking has been observed on test specimens of these compositions over extended test periods. To demonstrate this characteristic of these compositions, commercial samples of high pressure low density polyethylene and low pressure linear polyethylene were obtained for comparison with a sample of isotactic poly(butene-1) prepared by polymerizing butene-1 with a titanium trichloride and triethyl aluminum catalyst.

This isotactic poly(butene-1) was prepared in a continuous polymerization system in a run that extended over a 49 hour period. The catalyst employed was titanium trichloride and triethyl aluminum, the solvent was n-heptane, the reaction was conducted at 90° C. and the average residence time was calculated to be 160 minutes. The conditions were controlled so that about 20 percent yield of isotactic poly(butene-1) was obtained. The molar ratio of the reactants was 180 of butene-1 to one of titanium trichloride, 1.5 of triethyl aluminum to one of titanium trichloride and 4.9 of butene-1 to one of dry n-heptane (83 percent). The polymer was isolated from n-heptane by cooling, filtering, washing and drying the resultant polymer.

This and the two commercial polyethylene polymers were compounded on a mill with 50 parts of an abrasion furnace black identified as Kosmos 60 from United Carbon Company. The resulting compositions were tested for stress cracking failure time by the procedure given in Appendix I of ASTM Standards on Plastics, 1958. Compression molded plaques, 0.065 inch thick were prepared from the compounded stock. Individual test specimens were initially cut on the surface and specimens of each were bent and placed in a holder in a test tube containing Igepol CO 630 and were held at 50° C. Failure time of each sample was obtained by determining the time for five of ten specimens to develop a break. The high pressure polyethylene failure time was 0.5 hour. The low pressure ethylene failure time was 16 hours. The $F_{50}$ value for the two polyethylene samples was zero, and of the isotactic poly(butene-1), none of the samples were observed to break even after 1000 hours exposure time.

To demonstrate the improvement in tensile modulus obtained from isotactic poly(butene-1) containing carbon black, a series of compositions were prepared, using an isotactic poly(butene-1) prepared in a continuous polymerization system as described above using titanium trichloride and diethyl aluminum chloride as the catalyst. This polymer had a melt index of 2. The isotactic poly(butene-1) was compounded on a mill with 50, 100, and 150 weight parts of a furnace black known as Statex R provided by Columbian Carbon Company. The resulting compositions were molded and the tensile modulus determined in an Instron tester at a jaw separation rate of 0.2 inch per minute. The tensile modulus of the carbon black-free poly(butene-1) was 5000 p.s.i., with 50 parts of carbon black—16,800 p.s.i. with 100 parts of carbon black—67,800 p.s.i. and with 150 parts of carbon black—118,500 p.s.i. Another example of isotactic poly(butene-1) having a density of 0.914 and with better initial tensile modulus than the sample above, was similarly compounded with 50, 100 and 150 parts of Statex R. The resulting samples were tested and found to have a tensile modulus of 105,000 for 50 parts of carbon black, 159,000 for 100 parts of carbon black and 236,000 for 150 parts of carbon black.

Another isotactic poly(butene-1) was prepared by charging to a stirred autoclave 11.8 weight parts of titanium tetrachloride, 17.8 weight parts of triethyl aluminum and 1225 volume parts of n-heptane in an autoclave. This mixture was aged for 27 minutes at 69° C. 3471 weight parts of butene-1 was then added to the reactor and the reaction allowed to continue for three hours at 70° C. At the end of three hours the effluent from the reactor was treated with isopropyl alcohol to recover the polymer and the polymer was dried. A 57.6 percent yield of isotactic poly(butene-1) was obtained. The dried polymer had a melt index of 0.15 and tensile strength of 2845 p.s.i. with an elongation of 400 percent. A portion of this poly(butene-1) was compounded on a mill with 50 weight parts of a high abrasion furnace carbon black, Statex R, from Columbian Carbon Company. Samples of these two polymers were subjected to dead load tensile tests to establish creep properties. A summary of the data obtained from a series of tests are found in the table below.

| Polymer | S=1000 | | S=700 | |
| --- | --- | --- | --- | --- |
|  | e | e' | e | e' |
| Polybutene | 4.33 | 1.5 | 2.62 | 1.0 |
| Polybutene+Carbon Black | 1.16 | .09 | 1.25 | .04 |

S is stress in pounds per square inch, $e$ is elongation inches per inch at time of one minute and $e'$ is creep rate in inches per logarithmic cycle of time. It is obvious that the long term stress bearing property of poly(butene-1) containing this carbon black is improved.

To demonstrate other enhanced physical properties obtained through the use of carbon black, the following series of compounds were prepared and tested. A sample of isotactic poly(butene-1) made in a continuous system as described above was used as the base polymer. This polymer had a density of 0.907, a melt index of 0.88, tensile strength of 4,345 p.s.i., elongation of 320 percent, a tensile modulus of 28,400 p.s.i., and a yield strength of 2,500 p.s.i. This material was mixed on a two-roll mill with 25, 50 and 75 weight parts per 100 weight parts of poly(butene-1) of an intermediate abrasion furnace black known as Statex 125 from Columbian Carbon Company. The physical properties of the resulting compositions are set forth in the table below.

| Carbon Black, p.h.r. | Tensile Strength, p.s.i. | Modulus at Break, p.s.i. | Modulus 0%, p.s.i. |
| --- | --- | --- | --- |
| 25 | 3,029 | 26,089 | 86,402 |
| 50 | 3,719 | 62,101 | 182,355 |
| 75 | 4,122 | 96,362 | 194,373 |

This series of compounds was repeated with a semi-reinforcing black identified as Furnex from Columbian Carbon Company. The compounds prepared and physical properties thereof are set forth below.

| Carbon Black, p.h.r. | Tensile Strength, p.s.i. | Modulus at Break, p.s.i. | Modulus 0%, p.s.i. | Yield, p.s.i. |
| --- | --- | --- | --- | --- |
| 50 | 2,905 | 13,431 | 98,917 | 2,784 |
| 75 | 2,982 | 40,871 | 161,658 | 3,083 |
| 100 | 3,269 | 85,800 |  |  |

When this polymer was compounded with 150 weight parts of furnace thermal black identified as Thermax from Thermatomic Carbon Company, the tensile strength of the resulting composition was 2,530 p.s.i. and the modulus at 0 percent was 228,070 p.s.i.

Samples of the carbon black-containing poly(butene-1)'s described above were readily extruded into pipe through a cross head die and carried through a loose felt seal into a tank of water. Compositions containing 50 to 100 parts of carbon black per 100 weight parts of poly(butene-1) are particularly useful in this application. Compositions of carbon black and poly(butene-1) are more readily extruded than the raw polymer alone. This is in contrast with experience with other polyolefins such as polyethylene where it has been observed that the addition of substantial amounts of carbon black not only result in brittleness of the compositions but that the processing characteristics of polyethylene become progressively worse with increasing amounts of carbon black. Raw poly(butene-1) is extruded with some difficulty, but when the amounts of carbon black specified herein are mixed with the poly(butene-1), the lineal rate of extrusion of pipe can be increased through reduction of tack and increased stiffness of the polymer compositions.

Pipe samples containing 50 to 100 parts of carbon black have greatly improved yield points and burst strength as compared to pipe samples made of raw polymer. Such compositions represent a cost improvement through the use of the inexpensive carbon black. This pipe has excellent long term stress cracking ability as shown by long term pressure tests. Such pipe not only has high strength retention over long periods of time but is remarkably free from premature failures. These pipe samples also have very moderate creep or elongation rates and are thus less subject to increasing stresses with continued pressure service than polyethylene. These pipe samples also consistently show no signs of failure in stress cracking and heat cracking. With polyethylene pipe many long term failures of polyethylene are related to stress cracking, particularly when substantial amounts of carbon black are employed in the polyethylene. These poly(butene-1) pipe specimens containing carbon black are admirably suited to use of cold water pipe applications. Such pipes have a long and reliable pressure life, adequate flexibility and burst strength.

I claim:

1. A composition of matter comprising solid isotactic poly (butene-1) having a density from about 0.9 to about 0.92 a yield point above 500 p.s.i. and containing from about 35 to about 300 weight parts of carbon black per 100 weight parts of poly(butene-1).

2. A composition of matter comprising solid isotactic poly(butene-1) containing more than 50 percent ether insoluble polymer and having a density within the range of from about 0.9 to about 0.92, a yield point above 500 p.s.i. and containing from about 35 to about 200 weight parts of carbon black having an average particle size of about 200 to about 800 angstroms diameter per 100 weight parts of poly(butene-1).

3. A composition of matter comprising solid isotactic poly(butene-1) containing more than 50 percent ether insoluble polymer and having a density from about 0.9 to about 0.92, a yield point above 500 p.s.i. and containing from about 50 to about 150 weight parts of carbon black having an average size of about 200 to about 800 angstroms diameter per 100 weight parts of poly(butene-1).

4. A composition of matter comprising solid isotactic poly(butene-1) containing more than 50 percent ether insoluble polymer and having a density from about 0.9 to about 0.92, a yield point above 500 p.s.i. and containing from about 150 to about 250 weight parts of carbon black having an average particle size of about 200 to about 800 angstroms diameter per 100 weight parts of poly(butene-1).

5. A composition of matter having high stress cracking and load carrying properties comprising solid isotactic poly(butene-1) containing more than 50 percent ether insolubles, having a density from about 0.9 to about 0.92, a yield point above 500 p.s.i. and containing about 50 to about 150 weight parts per 100 weight parts of poly(butene-1) of a furnace carbon black having a particle size from about 300 to about 800 angstroms diameter.

References Cited

UNITED STATES PATENTS 3,264,253  8/1966  McCulloch et al. _____ 260—41

Encyclopedia of Polymer Science and Technology, volume 2, pp. 265, 766 John Wiley & Sons, Publisher.

MORRIS LIEBMAN, *Primary Examiner.*

JULIUS FROME, *Examiner.*

S. L. FOX, *Assistant Examiner.*

UNITED STATES PATENT OFFICE
CERTIFICATE OF CORRECTION

Patent No. 3,385,817                          May 28, 1968

Robert H. Jones

It is certified that error appears in the above identified patent and that said Letters Patent are hereby corrected as shown below:

Column 1, line 18, "continuation-in-part application" should read -- continuation-in-part of application --. Column 2, line 8, and column 6, lines 6 and 7, "poly(butene-1)'s", each occurrence, should read -- poly(butene-1)s --. Column 3, line 22, "compounds" should read -- compound --. Column 4, lin 2, "weight parts parts" should read -- weight parts --; line 13, "of poly(butene-1)" should read -- of the poly poly(butene 1) --. Column 6, line 49, "0.92 a yield" should read -- 0.92, a yield --; line 65, "average size" should read -- average particle size --.

Signed and sealed this 23rd day of December 1969.

(SEAL)

Attest:

Edward M. Fletcher, Jr.                      WILLIAM E. SCHUYLER, JR.
Attesting Officer                              Commissioner of Patents